United States Patent [19]
Takeoka

[11] Patent Number: 5,424,354
[45] Date of Patent: Jun. 13, 1995

[54] ROOM TEMPERATURE CURABLE POLYOGANOSILOXANE COMPOSITION

[75] Inventor: Toru Takeoka, Cincinnati, Ohio

[73] Assignee: Three Bond Co., Ltd., Hachioji, Japan

[21] Appl. No.: 174,035

[22] Filed: Dec. 28, 1993

[51] Int. Cl.$^6$ ............................................. C08K 3/22
[52] U.S. Cl. ................................... 524/497; 524/588; 524/783; 524/847; 524/863
[58] Field of Search ............ 524/863, 783, 847, 588, 524/497

[56] References Cited

U.S. PATENT DOCUMENTS

| | | | |
|---|---|---|---|
| 3,819,549 | 6/1974 | Imai et al. | 524/863 |
| 4,485,206 | 11/1984 | Inoue et al. | 524/719 |
| 4,525,565 | 6/1985 | Laisney et al. | 524/863 |
| 5,071,593 | 12/1991 | Takahashi et al. | 524/495 |
| 5,180,771 | 1/1993 | Arai et al. | 528/18 |
| 5,194,489 | 3/1993 | Frances et al. | 528/15 |

*Primary Examiner*—Melvyn I. Marquis
*Assistant Examiner*—Karen A. Dean
*Attorney, Agent, or Firm*—Scully, Scott, Murphy & Presser

[57] ABSTRACT

A room temperature curable polyorganosiloxane composition according to the present invention, which comprises the following components, is superior in handleability and affords a cured product superior in mechanical characteristics, particularly tear strength:

① 100 parts by weight of a polyorganosiloxane having at least two silanol groups in one molecule;
② 1–25 parts by weight of an organosilane or organosiloxane having in one molecule at least three hydrolyzable groups attached to silicon atom;
③ 0.01–10 parts by weight of a curing catalyst; and
④ 5–500 parts by weight of ultra-fine titanium oxide particles.

6 Claims, No Drawings

ROOM TEMPERATURE CURABLE POLYOGANOSILOXANE COMPOSITION

BACKGROUND OF THE INVENTION

The present invention relates to a room temperature curable polyorganosiloxane composition which exhibits a high strength, particularly a high tear strength, after curing.

Even if silicone polymers per se are crosslinked and cured, they merely afford very fragile rubbers, due to their characteristics (low intermolecular force and amorphous structure). Without the addition of a reinforcing filler, it is impossible to obtain satisfactory physical characteristics, and the products obtained are not employable actually. Therefore, various kinds of reinforcing fillers have heretofore been adopted for silicone polymers and the resulting products have actually been commercialized.

The reinforcing effect of a filler in a silicone rubber is very outstanding, not recognized in other synthetic rubbers, and it is several times as high as other synthetic rubbers. For this reason, various reinforcing fillers have heretofore been added to silicone products. Examples are fine silica powder, diatomaceous earth, quartz powder, calcium carbonate, zinc carbonate, magnesium carbonate and carbon black.

Above all, fine silica powder exhibits a particularly superior reinforcing effect, which effect is classified into a crystallization effect attained by the adsorption of silicone rubber to the silica surface and an effect attained by chemical bonding of silanols with each other on the silica surface. Reinforcement is effected by physical and chemical bonding with the silicone polymer to which the silica powder is added. Increasing the amount of silica used for enhancing its reinforcing effect also leads to a marked increase of viscosity and hence leads to deterioration in the handleability of the resulting silicone product itself. Thus, the amount of silica to be added has been restricted. For this reason, the silicone rubber with such fine silica powder incorporated therein has heretofore not been fully satisfactory in point of its mechanical characteristics. Moreover, the tear strength of the silicone rubber with such fine silica powder incorporated therein has heretofore not been improved, which is another drawback of the silicone rubber, and the improvement thereof has been desired particularly for a room temperature curing silicone rubber low in crosslinking density.

Due to the above-mentioned drawbacks, the silicone rubber, as a room temperature curing type product, has so far not been used for structural bonding and sealing.

Further, as a filler, pigment or additive, it has also been known to add titanium oxide to a silicone product, but by the addition of an ordinary form of titanium oxide, it has been impossible to obtain a satisfactory effect.

It is the object of the present invention to solve the above-mentioned problems of the prior art and provide a room temperature curable polyorganosiloxane capable of affording a cured product having superior mechanical characteristics, especially high tear strength, and also superior in processability.

SUMMARY OF THE INVENTION

The present invention resides in a room temperature curable polyorganosiloxane composition comprising:

① 100 parts by weight of a polyorganosiloxane having at least two silanol groups in one molecule;
② 1-25 parts by weight of an organosilane or organosiloxane having in one molecule at least three hydrolyzable groups attached to silicon atom;
③ 0.01-10 parts by weight of a curing catalyst; and
④ 5-500 parts by weight of ultra-fine titanium oxide particles.

DETAILED DESCRIPTION OF THE INVENTION

The first component in the composition of the present invention is a polyorganosiloxane having at least two silanol groups in one molecule. Preferred is a polydiorganosiloxane blocked with hydroxyl groups at both ends, namely, a dihydroxypolyorganosiloxane, which is represented by the following general formula:

(A)

where $R^1$ and $R^2$ are each independently a substituted or unsubstituted monovalent hydrocarbon group and a is an integer of 5 or more.

Preferred examples of the hydrocarbon groups $R^1$ and $R^2$ in the above formula (A) are usually those having not more than 12 carbon atoms, including alkyl groups such as methyl, ethyl and propyl, cycloalkyl groups such as cyclohexyl, alkenyl groups such as vinyl and allyl, and aryl groups such as phenyl and tolyl. Also employable are substituted hydrocarbon groups obtained by substituting hydrogen atoms in the above hydrocarbon groups partially with halogen atoms, etc. $R^1$ and $R^2$ may be the same or different. In the same formula, a is a value of 5 or larger, but more particularly it is a value corresponding to a viscosity of the diorganopolysiloxane at 25° C. in the range of 25 to 500,000 cSt, preferably 500 to 100,000 cSt.

The second component in the composition of the present invention is an organosilane or organosiloxane having in one molecule at least three hydrolyzable groups attached to silicon atom. This component acts as a crosslinking agent.

A preferred example of the second component is a silane, a hydrolyzate thereof or a partial hydrolyzate thereof, wherein said silane is represented by the following general formula:

$$R^3_{4-n}SiX_n \qquad (B)$$

wherein $R^3$ is a substituted or unsubstituted monovalent hydrocarbon group, X is a hydrolyzable group and n is 3 or 4. $R^3$ in the formula (B) is the same group as the foregoing $R^1$ and $R^2$. Examples of X include alkoxy groups such as methoxy, ethoxy and propoxy, alkenyloxy groups such as isopropenoxy and 1-ethyl-2-methyl vinyl oxime, ketoxime groups such as dimethylketoxime and methyl ethyl ketoxime, acyloxy groups such as acetoxy, propionoxy, butyroyloxy and benzoyloxime, amino groups such as dimethylamino and diethylamino, aminoxy groups such as dimethylaminoxy and diethylaminoxy, and amido groups such as N-methylacetamido, N-ethylacetamido and N-methylbenzamido. Preferably, these hydrolyzable groups have 1 to 12 carbon atoms.

As examples of the second component there are mentioned ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltri(butanoxime)silane, vinyltri(butanoxime)silane, phenyltri(butanoxime)silane, propyltri(butanoxime)silane, tetra(butanoxiume)silane, 3,3,3-trifluoropropyl(butanoxime) silane, 3-chloropropyl(butanoxime)silane, methytri(propanoxime)silane, methyltri(pentanoxime)silane, methyltri(isopentanoxime)silane, vinyl(cyclopentanoxime) silane and methyltri(cyclohexanoxime)silane, and partial hydrolyzates thereof or hydrolyzates thereof.

It is optional whether the crosslinking agent as the second component is to be a silane or a siloxane obtained by partial hydrolysis thereof. The siloxane may be any of straight-chained, branched and cyclic forms. The second component is not limited to one kind, but two or more kinds may be used in combination, provided it is necessary that the amount thereof be in the range of 1 to 25 parts by weight based on 100 parts by weight of the first component. If it is smaller than 1 part by weight, there will occur gelation of the composition during manufacture or preservation thereof, or an elastomer obtained from the composition may not exhibit desired physical properties, and an amount of the second component exceeding 25 parts by weight will result in increased shrinkage of the composition at the time of curing and hence deteriorated elasticity of the cured product.

The third component in the composition of the present invention is a curing catalyst which exhibits a catalytic action in a condensation reaction of the hydroxyl groups in the first component and the hydrolyzable groups in the second component. Conventional known curing catalysts are employable. As examples there are mentioned metallic salts of organic acids such as iron octanoate, iron naphthenate, cobalt octanoate, cobalt naphthenate, tin octanoate, tin naphthenate, lead octanoate and lead naphthenate, alkyltin esters such as dibutyltin diacetate, dibutyltin dilaurate and dibutyltin dioctoate, metal alcoholates such as tin halide, tin orthoester, tetrabutyl titanate and tetrabutyl zirconate, titanium chelates such as diisopropoxybis(acetylacetonato)titanium and diisopropoxybis(ethylacetoacetate)titanium, and amines such as ethylhydroxylamine, dimethylhydroxylamine and γ-aminopropyltriethoxysilane.

The curing catalyst as the third component is not limited to one kind, but two or more kinds may be used in combination, provided it is necessary that the amount of the third component be in the range of 0.01 to 10 parts by weight based on 100 parts by weight of the first component. If the amount of the third component is smaller than 0.01 part by weight, a longer time will be required for the formation of a tack-free film when the composition is exposed to air, and an amount thereof exceeding 10 parts by weight will result in an extremely short film forming time, several seconds, and hence deterioration of the working efficiency; besides, the heart resistance after curling will be affected. A preferred range is from 0.1 to 1.0 part by weight.

In the case where a compound having self-catalysis such as an aminoxy compound is used as the crosslinking agent of the second component, the third component need not be added separately.

The ultra-fine titanium oxide particles used as the fourth component in the composition of the present invention are smaller in diameter than 0.1 micron and larger in specific surface area than 30 $m^2/g$, thus are distinctly different from the fine titanium oxide particles commonly used. A preferred particle diameter range is from 0.01 to 0.05 micron and a preferred specific surface area is larger than 60 $m^2/g$. The surfaces of the ultra-fine titanium oxide particles may be untreated, or may be coated with an oxide of a metal such as aluminum, silicon or zirconia, or may be treated with an organic acid such as stearic acid or lauric acid or an organosiloxane oil. By using such titanium oxide in the composition of the present invention there is attained a remarkable improvement in physical characteristics, especially tear strength, of the composition required as a rubber material.

The amount of the fourth component is in the range of 5 to 500 parts by weight for 100 parts by weight of the first component. If it is smaller than 5 parts by weight, it will be difficult to obtain a cured silicone product superior in characteristics, and if it exceeds 500 parts by weight, the handleability of the composition will be deteriorated. A preferred range is from 40 to 300 parts by weight.

Where required, other known fillers and additives may be added to the composition of the present invention within the range not impairing the object of the invention.

As examples of fillers employable in the invention there are included those which are reinforcible, unreinforcible, electrically conductive, heat-radiative, or heat-resistant. As additives, various additives may be used, including adhesion improver, pigment, thixotropy improver, viscosity modifier, ultraviolet inhibitor, antifungal agent, solvent, heat resistance improver, cold resistance improver and flame-retardant.

The composition of the present invention is obtained by mixing all of the above components and, if necessary, various additives in a moisture-free condition. The composition thus obtained can be used as a one-pack type room temperature curing composition which is preserved as it is in a closed container and is exposed for curing to the moisture contained in the air. Alternatively, the composition of the present invention may be prepared in a separate form of crosslinking agent and curing agent from each other, then preserved separately in two or three containers and mixed together at the time of use, that is, it may be used as a multipack type room temperature curable composition.

Before curing, the room temperature curable organopolysiloxane composition of the present invention exhibits good processability, while after curing, physicomechanical characteristics, especially-tear strength, of the silicone rubber are improved.

The composition of the invention is employable for bonding, sealing and coating which are uses of the conventional room temperature curing organosiloxane compositions.

The following examples are given to further illustrate the present invention, but it is to be understood that the invention is not limited thereto. In the following examples, the "part(s)" represents part(s) by weight and the value of "viscosity" indicates a value at 25° C.

EXAMPLE 1

170 parts of a titanium oxide powder (SST-30-CT, a product of Titan Kogyo-Sha) having an average particle diameter of 0.01 to 0.02 micron and a specific surface area of not smaller than 90 $m^2/g$ and whose surface had been treated with a fluorine-modified silicone oil, was added to 100 parts of a hydroxyl end-blocked polydimethylsiloxane having a viscosity of 6,000 cSt, followed by mixing and stirring under a reduced pressure, allowing the powder to be dispersed uniformly. To the resulting mixture were further added 8 parts of vinyloximesilane and 0.05 part of dibutyltin dilaurate, followed by mixing and stirring in the absence of moisture to afford a composition.

EXAMPLE 2

170 parts of a titanium oxide powder (SST-30-SL, a product of Titan Kogyo-Sha) having an average particle diameter of 0.01 to 0.02 micron and a specific surface area of not smaller than 90 $m^2/g$ and whose surface had been treated with lithium stearate, was added to 100 parts of a hydroxyl end-blocked polydimethylsiloxane having a viscosity of 6,000 cSt, followed by mixing and stirring under a reduced pressure, allowing the powder to be dispersed uniformly. To the resulting mixture were further added 15 parts of vinyloximesilane and 0.05 part of dibutyltin dilaurate, followed by mixing and stirring in the absence of moisture to afford a composition.

EXAMPLE 3

150 parts of a titanium oxide powder (STA-100, a product of Sakai Chemical Industry Co., Ltd.) having an average particle diameter of 0.01 to 0.02 micron and a specific surface area of not smaller than 100 $m^2/g$ and whose surface had not been treated, was added to 100 parts of a hydroxyl end-blocked polydimethylsiloxane having a viscosity of 6,000 cSt, followed by mixing and stirring under a reduced pressure, allowing the powder to be dispersed uniformly. To the resulting mixture were further added 15 parts of vinyloximesilane and 0.05 part of dibutyltin dilaurate, followed by mixing and stirring in the absence of moisture to afford a composition.

COMPARATIVE EXAMPLE 1

170 parts of a titanium oxide powder (RCL-525, a product of SCM Chemical Co.) having an average particle diameter of 0.25 micron and a specific surface area of 20 $m^2/g$ and whose surface had been treated with aluminum, was added to 100 parts of a hydroxyl end-blocked polydimethylsiloxane, followed by mixing and stirring under a reduced pressure, allowing the powder to be dispersed uniformly. To the resulting mixture were further added 15 parts of vinyloximesilane and 0.05 part of dibutyltin dilaurate, followed by mixing and stirring in the absence of moisture to afford a composition.

COMPARATIVE EXAMPLE 2

170 parts of a titanium oxide powder (RCL-9, a product of SCM Chemical Co.) having an average particle diameter of 0.27 micron and a specific surface area of 15 $m^2/g$ and whose surface had been treated with aluminum, was added to 100 parts of a hydroxyl end-blocked polydimethylsiloxane having a viscosity of 6,000 cSt, followed by mixing and stirring under a reduced pressure, allowing the powder to be dispersed uniformly. To the resulting mixture were further added 15 parts of vinyloximesilane and 0.05 part of dibutyltin dilaurate, followed by mixing and stirring in the absence of moisture to afford a composition.

COMPARATIVE EXAMPLE 3

170 parts of calcium carbonate (WHITON SSB, a product of Shiraishi Kogyo-Sha) having an average particle diameter of 1.25 microns and a specific surface area of 1.8 $m^2/g$ was added to 100 parts of a hydroxyl end-blocked polydimethylsiloxane having a viscosity of 6,000 cSt, followed by mixing and stirring under a reduced pressure, allowing the calcium carbonate to be dispersed uniformly. To the resulting mixture were further added 15 parts of vinyloximesilane and 0.05 part of dibutyltin dilaurate, followed by mixing and stirring in the absence of moisture to afford a composition.

COMPARATIVE EXAMPLE 4

170 parts of a titanium oxide powder (ET-500W, a product of Ishihara Sangyo Kaisha, Ltd.) having an average particle diameter of 0.2 to 0.3 micron and a specific surface area of 7 $m^2/g$ and whose surface had been treated with tin oxide/antimony oxide, was added to 100 parts of a hydroxyl end-blocked polydimethylsiloxane having a viscosity of 6,000 cSt, followed by mixing and stirring under a reduced pressure, allowing the powder to be dispersed uniformly. To the resulting mixture were further added 15 parts of vinyloximesilane and 0.05 part of dibutyltin dilaurate, followed by mixing and stirring in the absence of moisture to afford a composition.

COMPARATIVE EXAMPLE 5

170 parts of a fine crystalline silica powder (1-207A, a product of Malvern Minerals Company) having an average particle diameter of 2 to 3 microns was added to 100 parts of a hydroxyl end-blocked polydimethylsiloxane having a viscosity of 6,000 cSt, followed by mixing and stirring under a reduced pressure, allowing the powder to be dispersed uniformly. To the resulting mixture were further added 15 parts of vinyloximesilane and 0.05 part of dibutyltin dilaurate, followed by mixing and stirring in the absence of moisture to afford a composition.

COMPARATIVE EXAMPLE 6

17 parts of a fine fumed silica powder (R972, a product of Degussa Inc.) having an average particle diameter of 0.016 micron and a specific surface area of 110 $m^2/g$ and 40 parts of carbon black (5305, a product of ASBURY Co.) were added to 100 parts of a hydroxyl end-blocked polydimethylsiloxane having a viscosity of 6,000 cSt, followed by mixing and stirring for uniform dispersion under a reduced pressure. Further added to the resulting mixture were 15 parts of vinyloximesilane and 0.05 part of dibutyltin dilaurate, followed by mixing and stirring in the absence of moisture to give a composition.

Run-1

The compositions obtained in Examples 1 to 3 and Comparative Examples 1 to 6 were each applied onto 2 mm thick sheet and allowed to cure 7 days in a standard state (20°±3° C., 55±10% RH). Thereafter, physical properties of the cured products were measured. The results obtained are as tabulated below.

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Processability | good | good | good | good | good | good | good | good | good |
| Hardness JIS A | 41 | 42 | 38 | 35 | 30 | 45 | 23 | 52 | 57 |
| Elongation % | 810 | 700 | 480 | 315 | 325 | 245 | 295 | 180 | 225 |
| Tensile Strength kg/cm$^2$ | 45.5 | 43.0 | 29.0 | 22.7 | 27.1 | 9.6 | 22.4 | 33 | 35.8 |
| *Tear Strength | 28.5 | 19.6 | 11.0 | 6.7 | 7.0 | 3.2 | 4.3 | 3.4 | 7.0 |

*: kg/cm

What is claimed is:

1. A room temperature curable polyorganosiloxane composition comprising:
   1. 100 parts by weight of a polyorganosiloxane having at least two silanol groups in one molecule;
   2. 1-25 parts by weight of an organosilane or organosiloxane having in one molecule at least three hydrolyzable groups attached to a silicon atom;
   3. 0-10 parts by weight of a curing catalyst; and
   4. 40-300 parts by weight of ultra-fine titanium oxide particles, said ultra-fine titanium particles having a particle diameter of about 0.01 to 0.05 microns and a specific surface area larger than 60 m$^2$/g.

2. The composition of claim 1, wherein the component  is a dihydroxyorganopolysiloxane represented by the following general formula:

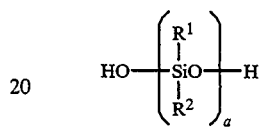

wherein $R^1$ and $R^2$ are each independently a substituted or unsubstituted monovalent hydrocarbon group, and a is an integer of not smaller than 5.

3. The composition of claim 1, wherein the component 2 is a silane, a hydrolyzate thereof or a partial hydrolyzate thereof, wherein said silane is represented by the following general formula:

$$R^3{}_{4-n}SiX_n$$

where $R^3$ is a substituted or unsubstituted monovalent hydrocarbon group, X is a hydrolyzable group, and n is 3 or 4.

4. The composition of claim 1, wherein the hydrolyzable groups are alkoxy, alkenyloxy, ketoxime, acyloxy, aminoxy or amido groups.

5. The composition of claim 1, wherein the curing catalyst is a metallic salt of an organic acid, a metal alcoholate or an amine.

6. The composition of claim 1, wherein said curing catalyst is present in an amount of 0.01-10 parts by weight.

* * * * *

UNITED STATES PATENT AND TRADEMARK OFFICE
CERTIFICATE OF CORRECTION

PATENT NO. : 5,424,354
DATED : June 13, 1995
INVENTOR(S) : Toru Takeoka

It is certified that error appears in the above-indentified patent and that said Letters Patent is hereby corrected as shown below:

On the title page: Item [54] and Column 1, line 2,

"POLYOGANOSILOXANE" should read --POLYORGANOSILOXANE--

Column 1, line 3: "POLYOGANOSILOXANE" should read --POLYORGANOSILOXANE--

Column 3, line 65: "heart" should read --heat--

Column 3, line 65: "curling" should read --curing--

Signed and Sealed this

Twenty-eighth Day of May, 1996

Attest:

BRUCE LEHMAN

Attesting Officer     Commissioner of Patents and Trademarks